United States Patent Office 3,356,001
Patented Dec. 5, 1967

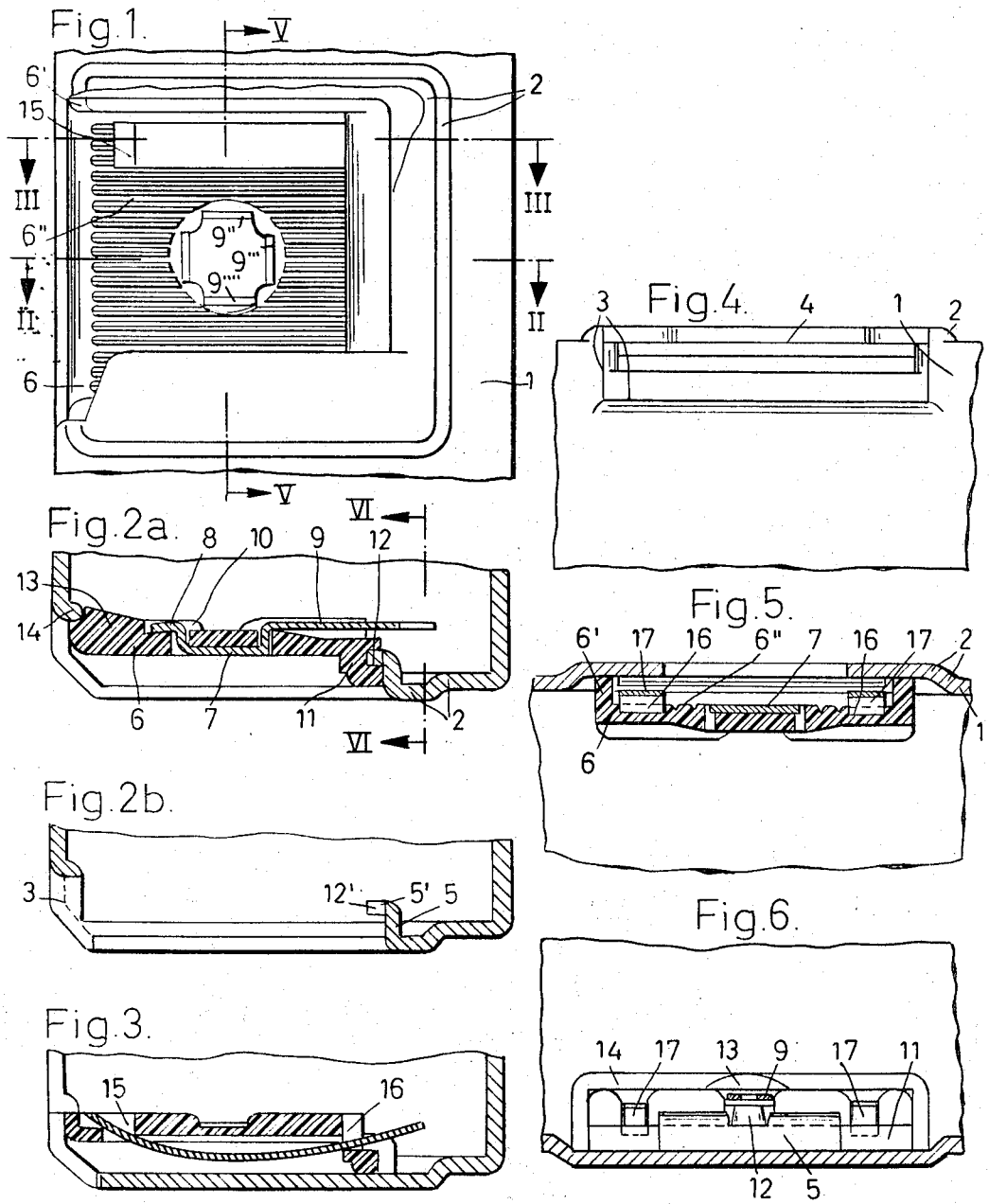

3,356,001
CAMERA ACCESSORY SHOE ARRANGEMENT
Karl Heinz Lange, Bunde-Ennigloh, Westphalia, Germany, assignor to Balda-Kamerawerk Rudolf Gruter Kommanditgesellschaft, Bunde, Westphalia, Germany, a German company
Filed July 13, 1965, Ser. No. 471,567
Claims priority, application Germany, July 18, 1964, B 77,735
5 Claims. (Cl. 95—11)

In prior patent specification No. 3,095,792 there is described and claimed an accessory shoe arrangement for the fitting of accessories, as for example, flashlights, rangefinders, exposure meters, to cameras which arrangement has special advantages. Whilst up to the date of that patent the accessory shoe was generally manufactured as a separate item and was secured to the camera top by riveting or screwing, that is to say, with the use of additional parts, the prior patent provided a device in which the lateral guideway for the foot of an accessory as well as the upper limit of the slide is formed by the camera top itself and preferably is produced by stamping out or pressing, and in which an accessory shoe is provided which is held in the interior of the camera top by the parts themselves without additional securing means. This gives a very economical and likewise aesthetic solution for the connection between accessory shoe and camera top. It operates aesthetically through the absence of gaps in the main part of the camera top and principally in that the fastening takes place without the use of any surface damaging rivets or screws and thus contributes to an economical production.

The present invention is concerned with an improvement of the device according to the earlier Patent No. 3,095,792.

The device according to the earlier patent required during the process of securing the accessory shoe a somewhat troublesome manipulation of the accessory shoe to the interior of the camera top through a suitable opening and subsequent bending of a lug either on the accessory shoe or on the top, and an appropriate deforming process, which requires tools and/or appliances.

In contrast the present invention provides a further substantial simplification and improvement in that the accessory shoe is insertable in a horizontal direction from outside into a suitable lateral opening, its front end being received and supported by a turned lug of the camera top, whilst a nose at the rear end on insertion slides resiliently over the rim of the opening into a rest position, from which the accessory shoe cannot be withdrawn except with the use of tools.

In this construction no troublesome manipulation and no tools are required for the insertion of the accessory shoe. It requires rather merely a horizontal push by the hand and then slides resiliently of its own accord into the terminal rest position, where it is immovably held.

One embodiment of the invention is described below with reference to the accompanying drawings, by way of example.

The drawings show:

FIGURE 1, a plan view of the new accessory shoe device,

FIGURE 2a, a vertical section along the line II—II of FIGURE 1 with inserted accessory shoe, FIGURE 2b, a similar vertical section of the camera top alone, FIGURE 3, a section along the line III—III of FIGURE 1, FIGURE 4, an external view of the opening side, FIGURE 5, a section along the line V—V of FIGURE 1, and FIGURE 6, a section along the line VI—VI of FIGURE 2.

In the drawings 1 is the camera top with a passage of horseshoe-shape, preferably formed by stamping and impressing, with an upwardly produced retaining rim 2 for the foot of an accessory not illustrated. The camera top has at the side a pocket- or socket-shaped vertical recess or opening 3 which connects with the horizontal opening 4 of the boundary or rim 2. The slit-like opening 4 is closed off at its camera side end by a lug 5 of the camera top or of the passage 2. In the opening 3 is inserted an accessory shoe 6, formed preferably from plastics, which is provided with a central contact 7. This is preferably formed as a stamping and has at least two lugs 8 and 9 of which at least one, in the present example the lug 9, is constructed with a soldering terminal 9'. The opening 10 in the accessory shoe 6 and the corresponding shape of the central contact 7 are preferably so adapted to one another that the lug 9 with the soldering terminal 9' can be inserted in at least three different positions 9'', 9''', 9'''' and locked by a simple bending round for the purpose of adaptation to the different circumstances with various camera types. The accessory shoe has slide grooves 6'', which form the lower guide for the not illustrated accessory, which as in the earlier patent is held in at the top by the rim 2. The pocket-shaped recesses 3 in the camera top 1 is wide enough to hold the accessory shoe 6. The latter has a horseshoe-shaped upper projecting rim 6' which can abut against the underside of the rim 2 and on insertion is guided by this.

In assembly, the accessory shoe 6 is pushed inwardly into the camera top through the pocket-shaped opening or recess 3 made by stamping and turning. A shaped corner 11 of the accessory shoe thus pushes on the doubly bent part 5, 5', of the camera top. A central nose 12 in the neighbourhood of the corner 11 which engages in a recess 12' of the horizontal lug part 5' thereby additionally secures the accessory shoe against lateral displacement. A nose 13 is also arranged centrally at the rear end of the accessory shoe 6 which nose on insertion of the accessory shoe springs over the lower edge 14 of the pocket-shaped recess 3 through resiliency of the accessory shoe 6 or of the camera top and locks the accessory shoe firmly and securely into the camera top. The accessory shoe can now only be drawn outwardly with the use of tools. The indicated leaf springs 17 which secure a fixed seating of the attachment foot of an accessory (not illustrated) in the accessory shoe, are (like the springs 16 of the earlier Patent No. 3,095,792) pushed into the slits 15 and 16.

As will be seen the connection of the accessory shoe device takes place without using tools and deforming operations and, in practice with a single handling.

I claim:
1. A camera accessory shoe arrangement comprising a camera top formed with lateral and vertical guide means slidably to receive the foot of an accessory and with a lateral opening and a bent lug, and an accessory shoe insertable from the exterior of the camera in a horizontal direction into said lateral opening of the camera top, the camera top and the accessory shoe having parts for holding the shoe in the interior of the camera top, said parts including said bent lug of the camera top, which receives and supports the front end of the accessory shoe, and a nose at the rear end of the accessory shoe which, on insertion, slides resiliently over a rim of the lateral opening into a rest position from which the accessory shoe cannot be withdrawn except with the use of tools.

2. A camera accessory shoe arrangement comprising a camera top formed by stamping with lateral and vertical guide means slidably to receive the foot of an accessory and with a lateral opening and a bent lug, and an accessory shoe insertable from the exterior of the camera in a horizontal direction into said lateral opening of the camera top, the camera top and the accessory shoe having parts for holding the shoe in the interior of the camera top, said parts including said bent lug of the camera top, which receives and supports the front end of the accessory shoe, and a nose at the rear end of the accessory shoe which, on insertion, slides resiliently over a rim of the lateral opening into a rest position from which the accessory shoe cannot be withdrawn except with the use of tools.

3. A camera accessory shoe arrangement comprising a camera top formed with lateral and vertical guide means slidably to receive the foot of an accessory and with a lateral opening and a bent lug, and an accessory shoe insertable from the exterior of the camera in a horizontal direction into said lateral opening of the camera top, the camera top and the accessory shoe having parts for holding the shoe in the interior of the camera top, said parts including said bent lug of the camera top, which receives and supports the front end of the accessory shoe and a nose at the rear end of the accessory shoe which, on insertion, slides resiliently over an inwardly turned shaped rim of the lateral opening into a rest position from which the accessory shoe cannot be withdrawn except with the use of tools, said rim having a lower edge which serves as a rest for the nose of the accessory shoe.

4. A camera accessory shoe arrangement comprising a camera top formed with lateral and vertical guide means slidably to receive the foot of an accessory and with a lateral opening and a bent lug, and an accessory shoe insertable from the exterior of the camera in a horizontal direction into said lateral opening of the camera top, said accessory shoe having an outwardly directed horseshoe-shaped rim to abut against the underside of said guide means and be guided thereby, the camera top and the accessory shoe having parts for holding the shoe in the interior of the camera top, said parts including the bent lug of the camera top which receives and supports the front end of the accessory shoe and a nose at the rear end of the accessory shoe which, on insertion, slides resiliently over a rim of the lateral opening into a rest position from which the accessory shoe cannot be withdrawn except with the use of tools.

5. A camera accessory shoe arrangement comprising a camera top formed with lateral and vertical guide means slidably to receive the foot of an accessory and with a lateral opening and a bent lug, and an accessory shoe having a recess for the reception of a contact, in either one of at least two different positions, to suit different types of cameras, said shoe being insertable from the exterior of the camera in a horizontal direction into said lateral opening of the camera top, the camera top and the accessory shoe having parts for holding the shoe in the interior of the camera top, said parts including said bent lug of the camera top, which receives and supports the front end of the accessory shoe, and a nose at the rear end of the accessory shoe which, on insertion, slides resiliently over a rim of the lateral opening into a rest position from which the accessory shoe cannot be withdrawn except with the use of tools.

References Cited

UNITED STATES PATENTS

| 2,910,573 | 10/1959 | Bing et al. | 95—11.5 |
| 3,095,792 | 7/1963 | Lange | 95—11 |
| 3,286,612 | 11/1966 | Lieser | 95—11 |

FOREIGN PATENTS

| 1,145,472 | 3/1963 | Germany. |

NORTON ANSHER, *Primary Examiner.*

FRED L. BRAUN, *Assistant Examiner.*